Feb. 16, 1932.     R. J. BRITTAIN, JR     1,845,647
JOURNAL BOX AND CAR FRAME CONSTRUCTION
Filed Dec. 2, 1929     2 Sheets-Sheet 1

INVENTOR
RICHARD J. BRITTAIN JR.
BY
Gales P. Moore
HIS ATTORNEY.

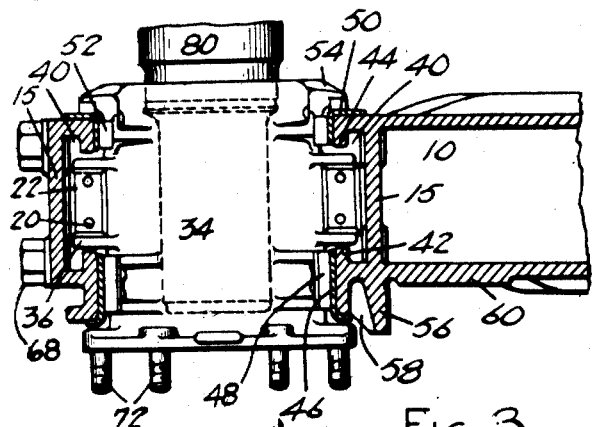
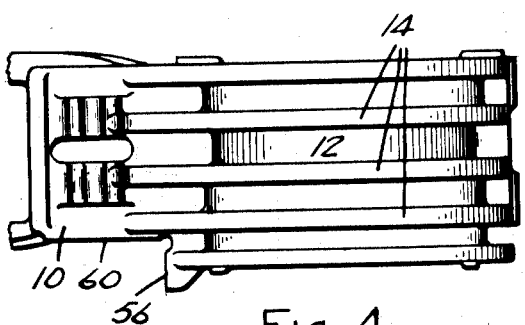
Fig. 3.
Fig. 4.
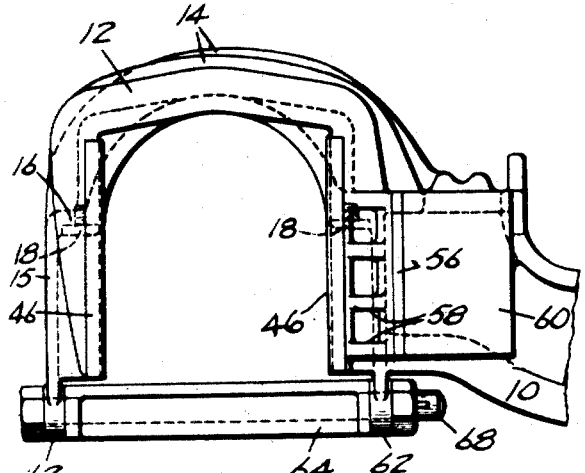
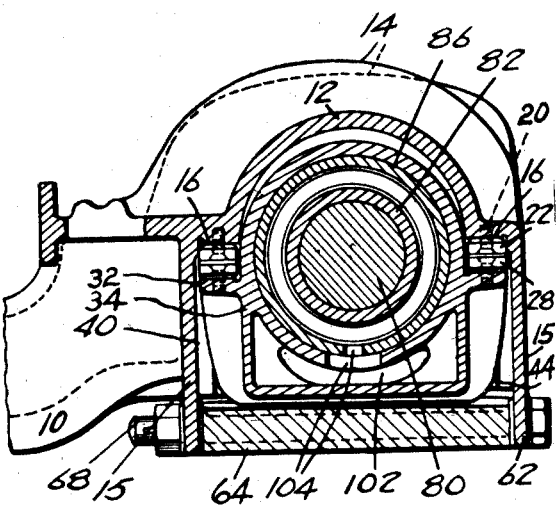
Fig. 5.
Fig. 6.
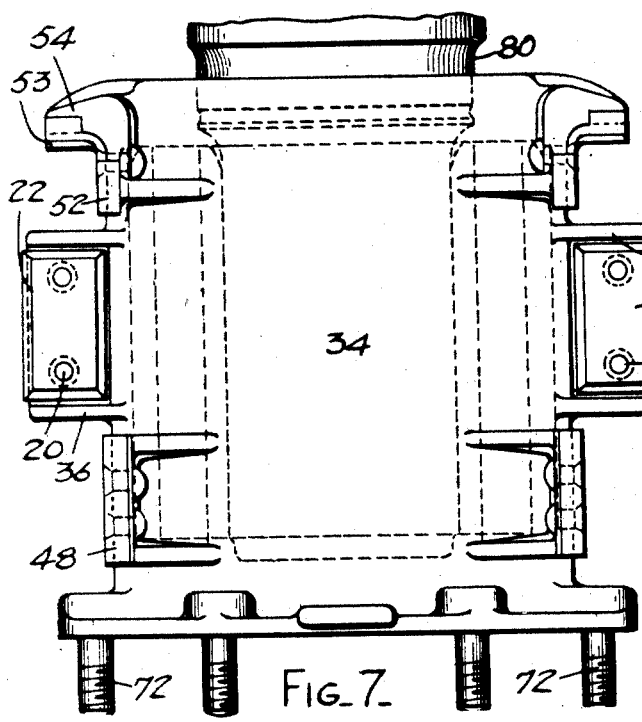
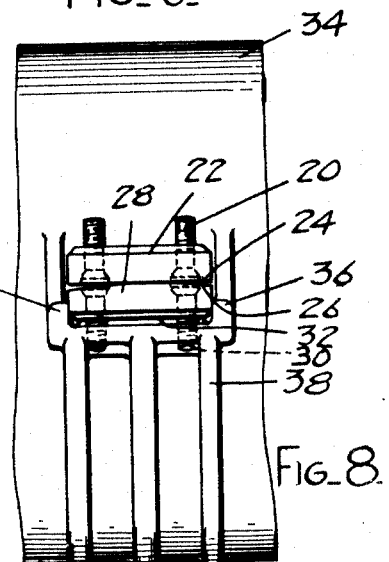
Fig. 7.
Fig. 8.
INVENTOR
RICHARD J. BRITTAIN, JR.
BY Gales P. Moore
HIS ATTORNEY Patented Feb. 16, 1932

1,845,647

UNITED STATES PATENT OFFICE

RICHARD J. BRITTAIN, JR., OF BLOOMFIELD, NEW JERSEY, ASSIGNOR TO GENERAL MOTORS CORPORATION, OF DETROIT, MICHIGAN, A CORPORATION OF DELAWARE

JOURNAL BOX AND CAR FRAME CONSTRUCTION

Application filed December 2, 1929. Serial No. 411,010.

This invention relates to journal box and car frame construction and comprises all the features of novelty herein disclosed. An object of the invention is to provide improved devices for mounting a car frame or the like on a journal box in a manner to allow the needed freedom of oscillation of one member with respect to the other. Another object is to provide an improved frame and axle box connection wherein load is applied near the level of the center of the axle, as to minimize bearing stresses. Another object is to provide a journal box and frame with improved means of resisting end thrust forces.

To these ends and to improve generally and in detail upon devices of this character, the invention also consists in the various matters hereinafter described and claimed. In its broader aspects, the invention is not necessarily limited to the specific construction selected for illustrative purposes in the accompanying drawings in which Fig. 1 is a vertical central section of an axle box.

Fig. 3 is a sectional view of one end of a car frame with a plan view of the box.

Fig. 4 is a plan view of the other end of the car frame.

Fig. 5 is a side elevation of one end of the car frame with axle box omitted.

Fig. 6 is a vertical section of the other end of the car frame with axle box inserted.

Fig. 7 is a plan view of the box and

Fig. 8 is a side view of a portion of the box and the seat plates.

Figure 1:
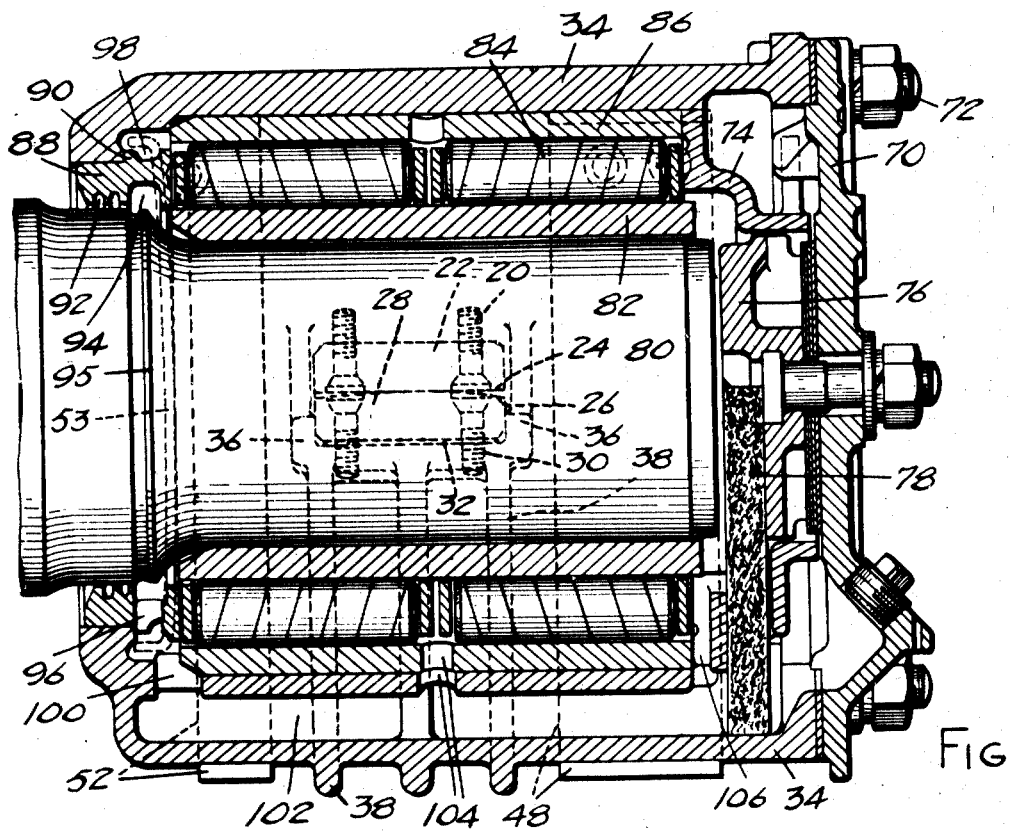
Figure 2:
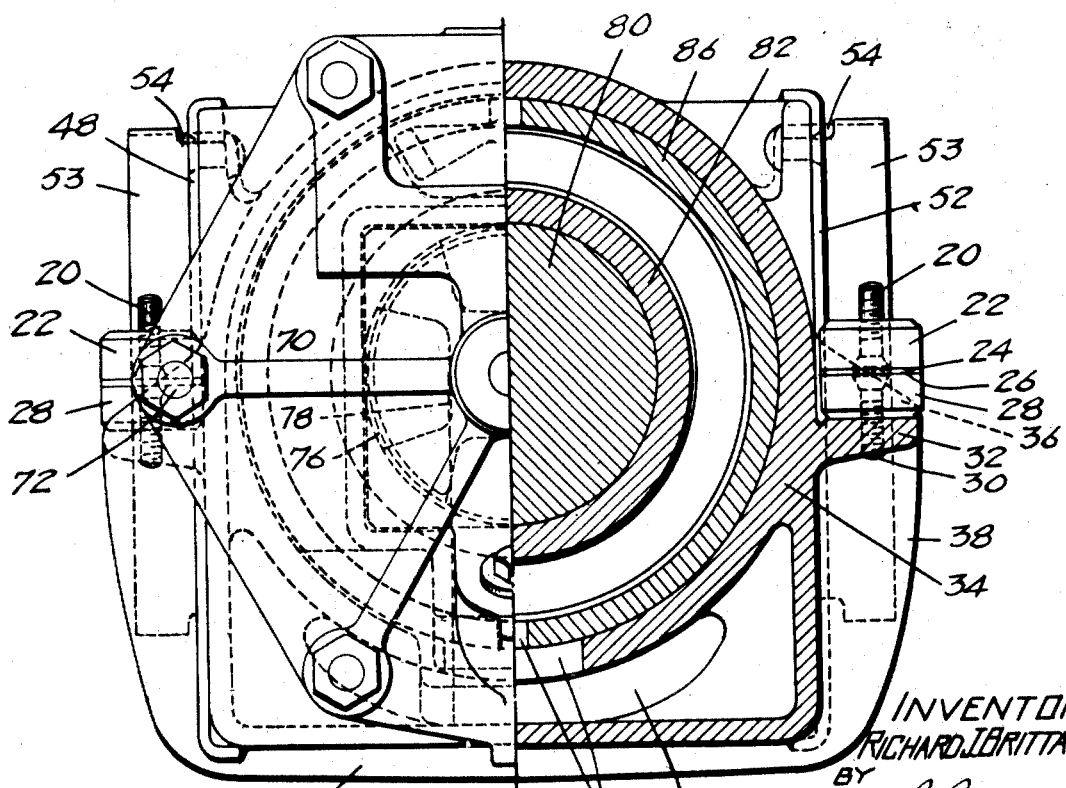
Fig. 2 is an end elevation and half section of the box.

The numeral 10 indicates a side frame, dropped in the middle and having each end formed as a yoke 12 arched over an axle box and braced by flanges or webs 14. Vertical legs 15 on the yoke embrace the sides of an axle box on which the yoke is rockably supported by relatively crowned engaging surfaces carried by the sides of the box and yoke near axle center. The yoke has horizontal internal projections or ledges 16 between end walls 18 and the ledges are tapped to receive threaded studs 20 which secure upper seat plates 22 to the yoke. Each plate 22 has its lower face 24 preferably flat and rockably seated on a crowned face 26 of a similar seat plate 28 which is fastened by threaded studs 30 to a projecting ledge or shelf 32 of a journal box 34. Each plate 28 is confined between end walls formed by ears 36 at the ends of the shelf, the shelf being braced by flanges 38 extending down across the bottom of the box. One of the engaging surfaces 24 and 26 is preferably cylindrically crowned longitudinally of the box and permits a limited, free relative rocking movement between box and frame. The relatively crowned surfaces may be formed directly on the box and yoke but it is preferred to have them on renewable hardened seat plates as disclosed. These surfaces are arranged on a level with the axle center line thereby reducing, to a minimum, the height from the center of the journal to the top of the frame. This allows sufficient clearance for removing pistons from cylinders of locomotives even with the journal boxes placed outside the driving wheels. This arrangement also decreases the tendency of the load to cant or tilt the journal box and so overloading the axle bearings at the ends.

The projecting shelves 32 and their seat plates are received in recesses 40 of the yoke between vertical, inwardly projecting or internal flanges 42 and 44 which are angular. A wear plate 46 is riveted to each flange 42 to slidably engage a wear plate 48 riveted to the side of the box outside the shelf 32. An angled wear plate 50 is secured to each angular flange 44 and its two legs engage an angled wear plate having legs 52 and 53 fastened to the box and to a single pedestal flange 54 thereon. The legs 53 present convexly crowned surfaces to the corresponding legs of the plate 50 to allow for relative rocking of box and yoke if the wear plates are in contact. Outward displacement of the journal box is resisted at each side by engagement of the pedestal flange or its wear plate leg 53 with the wear plate 50. Inward displacement, as will appear, is resisted by contact of an axle block with the end of the axle, there being no outer pedestal flanges. Tractive loads are taken crosswise of the box by those legs of the wear plates which slidably engage the wear plates on the sides of the box.

Near each end and on one side of each side frame, there is a projecting flange 56 braced by webs 58, the flange having a finished guide face at right angles to a finished face 60. Lugs 62 project downwardly from each leg 15 of the yoke to a point below the journal box where they are united by a cross bar 64 having recesses for clamping bolts 68. There is clearance between the cross bar and the bottom of the box as well as between the top of the box and the arched portions of the side frame thereby allowing the relative rocking crosswise of the frame. Hence the side frame acts both as a side frame and as an equalizer.

Referring to Fig. 1, the box has an end cap 70 secured by studs 72, and a ring 74 is interposed between the cap and the bearings. The ring 74 has an opening receiving a thrust block 76 bolted to the end cap and lubricated by a wick 78. The thrust block opposes the end of an axle 80 to resist inward displacement of the box. The axle carries a sleeve 82 and a pair of roller bearings 84 running in a sleeve 86 in the bore of the box. To avoid an overload on the ends of rollers as is more apt to occur at their outer ends than at their inner ends, the middle point of the bearings is arranged a little outside of the centers of the relatively crowned surfaces 24 and 26 of the rockers. A bushing 88, having a locating collar 90, is pressed into the inner end wall of the box and has grease grooves 92 at the axle. An internal groove 94 receives oil thrown off from a rib 95 on the shaft and conducts it through a notch 96 at the bottom while an external relief groove 98 receives oil from the outer race sleeve and conducts it through a notch 100 in the box to a reservoir 102. Oil in the reservoir is kept at the level of the lowermost rollers and has access to the rollers through the notch 100, through central openings 104, and through a notch 106 at the bottom of the ring 74. Surging movement of the box will agitate the lubricant and keep the roller bearings oiled if the supply gets low.

I claim:

1. In a device of the character described, a journal box, an axle journalled in the box, the sides of the box having supporting surfaces projecting outwardly at the level of the axle center, a yoke member arching over the box and having legs embracing the sides of the box, the yoke member having supporting surfaces extending inwardly over the supporting surfaces of the box, the engaging surfaces of the box and yoke member being relatively crowned longitudinally of the axle, and the crowning being at the level of the axle center; substantially as described.

2. In a device of the character described, a journal box, an axle journalled in the box, the sides of the box having supporting surfaces projecting outwardly at the level of the axle center, a yoke member arching over the box and having legs embracing the box, the yoke member having supporting surfaces extending inwardly over the supporting surfaces of the box, the supporting surfaces of the box and yoke member being relatively crowned longitudinally of the axle, the middle of the crown being at the level of the axle center and offset inwardly with respect to the middle point of the journalled portion of the axle; substantially as described.

3. In a device of the character described, a journal box, an axle journalled in the box, the sides of the box having horizontal shelves projecting outwardly, lower seat plates resting on the shelves and having upper supporting surfaces arranged at the level of the axle center, a yoke member arching over the box and having legs embracing the box, the yoke member having internal projections, upper seat plates engaging the projections and having lower supporting surfaces resting on the upper supporting surfaces of the lower seat plate, and the engaging supporting surfaces being relatively crowned; substantially as described.

4. In a device of the character described, a journal box, an axle journalled in the box, the sides of the box having horizontal shelves projecting outwardly, end walls at the ends of the shelves, seat plates resting on the shelves and confined between the end walls, the seat plates having upper supporting surfaces arranged at the level of the axle center, a yoke member arching over the box and having legs embracing the box and the outer sides of the seat plates, and the yoke member having internal projections with supporting surfaces resting on the supporting surfaces of the seat plates; substantially as described.

5. In a device of the character described, a journal box, an axle journalled in the box, the sides of the box having horizontal shelves projecting outwardly, end walls at the ends of the shelves, lower seat plates resting on the shelves and confined between the end walls, the seat plates having upper supporting surfaces arranged at the level of the axle center, a yoke member arching over the box and having legs embracing the box and the outer sides of the seat plates, the yoke member having internal projections each having a horizontal wall and end walls, an upper seat plate engaging the horizontal wall and confined between the end walls, and each upper seat plate having a lower supporting surface resting on the upper supporting surface of the lower seat plate; substantially as described.

6. In a device of the character described, a journal box, an axle journalled in the box, the sides of the box having shelves projecting outwardly near axle level, lower seat plates fastened to the shelves, a yoke member having legs embracing the box, the yoke member having internal projections, upper seat plates fastened to the projections, and the upper and lower seat plates having engaging surfaces which are relatively crowned longitudinally of the axle; substantially as described.

7. In a device of the character described, a journal box, an axle journalled in the box, the sides of the box having shelves projecting outwardly near axle level, lower seat plates fastened to the shelves, a yoke member having legs embracing the box, the yoke member having internal projections, upper seat plates fastened to the projections, the upper and lower seat plates having engaging surfaces which are relatively crowned longitudinally of the axle, and said engaging surfaces being arranged at axle level; substantially as described.

8. In a device of the character described, a journal box, an axle journalled in the box, the opposite sides of the box having supporting surfaces projecting outwardly near axle level, a yoke member arching over the box and having legs at opposite sides of the box, the yoke member having supporting surfaces extending inwardly near axle level and resting on the supporting surfaces of the box, said engaging surfaces being relatively crowned longitudinally of the axle, and the legs having inwardly extending flanges engaging the sides of the box; substantially as described.

9. In a device of the character described, a journal box, an axle journalled in the box, the opposite sides of the box having supporting surfaces projecting outwardly near axle level, a yoke member arching over the box and having legs embracing the box, the yoke member having supporting surfaces extending inwardly near axle level and resting on the supporting surfaces of the box, and the sides of the box having vertical flanges for engaging the legs to resist longitudinal movement of the box in one direction; substantially as described.

10. In a device of the character described, a journal box, an axle journalled in the box, the opposite sides of the box having supporting surfaces projecting outwardly near axle level, a yoke member arching over the box and having legs embracing the box, the yoke member having supporting surfaces extending inwardly near axle level and resting on the supporting surfaces of the box, the sides of the box having vertical flanges for engaging the legs to resist longitudinal movement of the box in one direction, and the box having thrust means engaging the axle to resist longitudinal movement of the box in the opposite direction; substantially as described.

11. In a device of the character described, a journal box, an axle journalled in the box, a yoke member having legs provided with vertical inwardly projecting flanges embracing the box, each side of the box having a single pedestal flange for engagement with one of said inwardly projecting flanges to resist displacement of the box in one direction, and the box having thrust means for engagement with the axle to resist displacement of the box in the opposite direction; substantially as described.

12. In a device of the character described, a journal box, an axle journalled in the box, a yoke member having legs provided with vertical flanges projecting inwardly and embracing the box, the box having yoke supporting means projecting outwardly between the inwardly projecting flanges of the legs, and each side of the box having a pedestal flange for engagement with one of said inwardly projecting flanges to resist displacement of the box in one direction; substantially as described.

13. In a device of the character described, a journal box, an axle journalled in the box, a yoke member having legs provided with vertical flanges projecting inwardly and embracing the box, the box having yoke supporting means projecting outwardly between the inwardly projecting flanges of the legs, each side of the box having a pedestal flange, and one of the inwardly projecting flanges on each leg being angular to present a face to the pedestal flange to resist longitudinal displacement of the box and to present another face to the side of the box to transmit tractive forces; substantially as described.

14. In a device of the character described, a journal box, an axle journalled in the box, a yoke member having legs, each provided with a pair of spaced internal flanges, the box and the yoke member having rocking engagement at the level of the axle center, the sides of the box each having a single pedestal flange for engagement with the side of one of said internal flanges of the legs and the sides of the box having a longitudinal sliding engagement with the other internal flanges of the legs; substantially as described.

15. In a device of the character described, a journal box, an axle journalled in the box, a yoke member having legs provided with a pair of spaced internal flanges, the sides of the box each having a pedestal flange for engagement with the side of one of said internal flanges of the legs, the sides of the box also having supporting projections entering the recesses between the spaced flanges of the legs, and the yoke member being carried by said supporting projections; substantially as described.

16. In a device of the character described, a journal box, an axle journalled in the box, a yoke member extending over the top of the box and having legs embracing the box, the legs having spaced vertical internal flanges, and the sides of the box having projections extending into the recesses between the flanges; substantially as described.

17. In a device of the character described, a journal box, an axle journalled in the box, a yoke member extending over the top of the box and having legs embracing the box, the legs having spaced internal flanges, the sides of the box having supporting projections extending into the recesses between the spaced flanges of the legs, and the yoke member being carried by said supporting projections; substantially as described.

18. In a device of the character described, a journal box, an axle journalled in the box, a yoke member having legs provided with vertical internal flanges embracing the box, the yoke member and box having a rocking engagement one with the other at the level of the axle center, each side of the box having a pedestal flange for engagement with the side of one of the internal flanges of the legs, the engaging surfaces of said flanges being relatively crowned in a vertical direction; substantially as described.

In testimony whereof I hereunto affix my signature.

RICHARD J. BRITTAIN, Jr.